United States Patent [19]

Kawakami

[11] 4,384,197
[45] May 17, 1983

[54] MAGNETIC DETECTION DEVICE FOR USE IN BANK NOTE DISCRIMINATING APPARATUS

[75] Inventor: Moriatsu Kawakami, Tokyo, Japan

[73] Assignee: Laurel Bank Machine Co., Ltd., Tokyo, Japan

[21] Appl. No.: 271,111

[22] Filed: Jun. 8, 1981

[30] Foreign Application Priority Data

Jun. 12, 1980 [JP] Japan ............................ 55/82294[U]

[51] Int. Cl.³ ............................................ G06K 13/05
[52] U.S. Cl. .................................... 235/485; 235/483; 235/449
[58] Field of Search ................ 235/485, 491; 209/534; 194/4 R

[56] References Cited

FOREIGN PATENT DOCUMENTS 54-21798  2/1979  Japan .................................... 235/485

Primary Examiner—Harold I. Pitts
Attorney, Agent, or Firm—Fleit, Jacobson & Cohn

[57] ABSTRACT

A magnetic detection device for use in a bank note discriminating apparatus is proposed. A magnetic pattern which has been already formed on each bank note by applying the magnetizable printing ink thereon is detected by a magnetic detecting head of the device. The device further includes a conveyer driven at a conveying speed of $V_1$, and a positioning roller rotated at a circumferential speed of $V_2$. According to this invention, the speed $V_2$ is adjusted to be approximately equal to or only slightly higher than the speed $V_1$. According to another feature of this invention, the detection face of the magnetic head is spaced from the opposing peripheral face of the positioning roller by a gap D which is greater than the thickness T of the bank notes to be handled. By the use of the device of this invention constructed and operated as aforementioned, the magnetic detecting head is prevented from picking up noise signals caused by impulsive force applied thereon by the impinging leading end of the inserted bank note or uneven compression force otherwise applied thereon by the bank note which is bent on or above the magnetic head when the speed $V_2$ is appreciably different from the speed $V_1$ to accelerate or decelerate the travelling speed of the bank note just above the magnetic head.

5 Claims, 3 Drawing Figures

MAGNETIC DETECTION DEVICE FOR USE IN BANK NOTE DISCRIMINATING APPARATUS

BACKGROUND OF THE INVENTION

1. Field of the Invention

The present invention relates to a device for discriminating the genuineness of bank note, and particularly to a magnetic detection device to be used in a bank note discriminating apparatus wherein the magnetic patterns formed on the bank notes by the magnetizable printing inks are detected by a magnetic detecting head to know the genuineness and kind of the bank notes.

2. Prior Art

A typical magnetic detection device used in a conventional bank note discriminating apparatus is shown in FIG. 1. In the illustrated prior art device, a bank note 2 is moved by a conveyer roller assembly 1 along a passage 4 formed by guide members 3. A magnetic detecting head 5 is arranged in the way of the passage 4. A press roller 6 opposes to the magnetic detecting head 5, and the bank note 2 is inserted in-between the head 5 and the roller 6 to be moved therethrough. The magnetic pattern born on the surface of the bank note 2 is detected by the magnetic detecting head 5 when the bank note is moved through the head 5. In the illustrated prior art device, the upper rollers 1 and 6 are biased downwards by the action of compression springs 7 to press the bank note 2 against the lower roller 1 and the magnetic detecting head 5. The device shown in FIG. 1 has a disadvantage that the bank note 2 tends to be folded or crimpled as it is inserted between the head 5 and the roller 6 since the press roller 6 is not rotated. This disadvantageous tendency is induced by the fact that no substantial gap is formed between the head 5 and the press roller 6.

In order to solve the aforementioned problem, a proposal has been made and disclosed by Japanese Utility Model Laid-Open Publication No. 54088/1978. The technique proposed by this preceding publication includes a press roller 6 which is preliminarily driven at a circumferential speed higher than that of the conveyer roller 1 to allow the bank note 2 to slip at the vicinity of the press roller 6 thereby to stretch the creases of the bank note 2.

However, in either of the devices shown in FIG. 1 and disclosed in Japanese Utility Model Laid-Open Publication No. 54088/1978, the press roller 6 is forced to abut against the magnetic head 5 by the biasing force of the spring 7 to clamp the bank note 2 so that the leading end of the bank note 2 comes into collision against the magnetic head 5 which in turn generates a noise signal upon collision with the leading end of each bank note. As a result, in such a conventional device, it is inevitable that the magnetic head 5 picks up a noise signal generated in proportion to the impulsive force which varies depending on the conveyed speed of the bank note 2. Moreover, since the press roller 5 rotates while being engaged with the face of the travelling bank note 2, vibrations due to elastic deformation or tottering of the press roller 6 induce further noise signals. For these reasons, accuracy in discriminating the bank note 2 is decreased as the conveying speed increases. Accordingly, the conventional device of this type has a disadvantage that the operational speed of the machine could not be increased.

SUMMARY AND OJBECT OF THE INVENTION

It is, therefore, an object of the invention to provide a magnetic detection device to be used in a bank note discriminating apparatus which is freed from the aforementioned disadvantages of the prior art device.

Another object of the invention is to provide a magnetic detection device to be used in a bank note discriminating apparatus, by which the bank notes are passed through the magnetic detecting head without applying appreciable impulsive force on the magnetic detecting head to obviate generation of noise signal.

A further object of the invention is to provide a magnetic detection device to be used in a bank note discriminating apparatus, in which the travelling speed of the bank notes through the magnetic detecting head can be increased without the fear of decreasing the accuracy in discriminating operation.

According to one aspect of the invention, the magnetic detecting head and the positioning roller are opposingly spaced from each other by a gap which is greater than the thickness of the bank notes to be passed therebetween at a relatively high speed. According to another aspect of this invention, the circumferential speed of the positioning roller is substantially equal to the travelling speed of the bank notes so that the detection signal from the magnetic detecting head is prevented from being hampered by a noise signal. As the results of the characteristic features of this invention as mentioned above, the device according to this invention has advantages that the accuracy in discriminating operation is increased and that the operational speed of the device can be increased.

More specifically, this invention provide a magnetic detection device to be used in a bank note discriminating apparatus, comprising a conveyer for passing bank notes one by one along a bank note passage at a predetermined speed, a magnetic detecting head facing to said passage, and a positioning roller opposing to said magnetic detecting head and spaced from said magnetic detecting head by a gap greater than the thickness of the passing bank notes, the circumferential speed of said positioning roller being substantially equal to the conveying speed of said conveyer.

DESCRIPTION OF THE DRAWING

The above and other advantages and features of the present invention will become apparent from the following description of the preferred embodiment thereof with reference to the appended drawing, in which.

DESCRIPTION OF THE PREFERRED EMBODIMENT

Now referring to FIGS. 2 and 3, the presently preferred embodiments of this invention will be described to facilitate full understanding of this invention.

Figure 1:
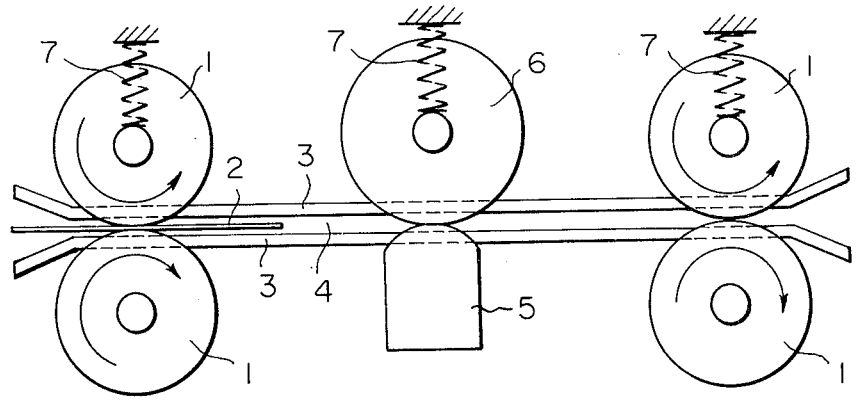
FIG. 1 is a diagrammatical view showing important parts of a prior art device.
Figure 2:
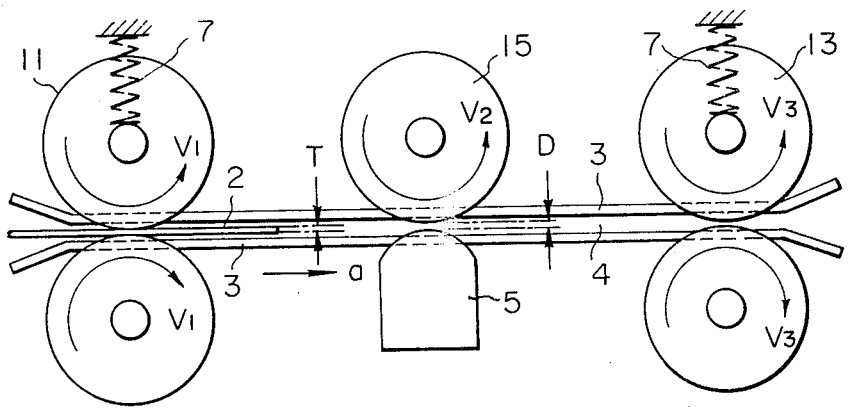
FIG. 2 is a diagrammatical view showing important parts of an embodiment of this invention.

FIG. 2 shows a first embodiment of this invention, in which the same or similar parts are denoted by the same reference numerals as used in FIG. 1 showing a typical example of the prior art device. In the first embodiment shown in this Figure, the bank note 2 is conveyed by a conveyer assembly including conveyer rollers 11 to 14 along the passage 4 at a predetermined velocity $V_1$, for example 2 m/sec, in the direction denoted by the arrow (a). The conveying velocity may be varied within the range of from 0.8 m/sec to 3 m/sec. In the way of the passage 4 formed by these conveyer rollers 11 to 14 and the guide members 3, there are disposed a magnetic detecting head 5 and a positioning roller 15 opposing to the magnetic detecting head 5. The head 5 and the roller 15 are spaced by a gap D which is greater than the thickness T of the bank note 2. The positioning roller 15 is rotated at a circumferential velocity $V_2$ which is approximately equal to said predetermined velocity $V_1$. When using the device shown in FIG. 2, the bank note 2 is prevented from being crimpled by maintaining the interrelation between the velocities $V_1$, $V_2$ and $V_3$ within the relative rate represented by the following inequality of:

$$V_1 \leq V_2 \leq V_3$$

wherein $V_1$ is the circumferential velocity of the rollers 11 and 12, $V_2$ is the circumferential velocity of the roller 15 and $V_3$ is the circumferential velocity of the rollers 13 and 14.

The function of the magnetic detection device as described above will now be mentioned.

Although, the portions of the bank note 2 applied with magnetic inks are preferably magnetized by a magnetization device, not shown, at the preceding step to increase the sensitivity in detection, such a magetization device may be omitted. The bank note 2 is then conveyed at a velocity $V_1$ in the direction denoted by the arrow (a) to guide the leading end of the bank note 2 inbetween the magnetic detecting head 5 and the positioning roller 15. Since the gap D between the head 5 and the roller 15 is adjusted to be greater than the thickness T of the bank note 2, the bank note 2 passed through the magnetic detecting head 5 while the leading end and the faces of the bank notes do not contact with either of the head 5 and the positioning roller 15, or even when any portion of the bank note 2 contacts with either of the head 5 or the roller 15 the contacting pressure is very small. The magnetic pattern of the bank note 2 is detected by the magnetic detecting head 5 as the bank note 2 passes through the head 5. The sensitivity in detection is improved as the conveying velocity $V_1$ is increased, since the frequency characteristic of the wave generated by the detected change in magnetism is improved. Also, according to this invention, the circumferential velocity $V_2$ of the positioning roller 15 opposing to the magnetic detecting head 5 approximates to the velocity $V_1$ so that the relative difference $V_2-V_1$ is nearly zero, in other words, the bank note 2 is neither accelerated nor decelerated by the positioning roller 15. A bending force forcing the bank note 2 to be warped toward the magnetic head 5, the bending force being in proportion to the difference $V_2-V_1$, is applied on the bank note 2, if the difference between the velocities $V_2$ and $V_1$ is considerably large as will be represented by $V_2-V_2>0$. Although the condition of $V_2-V_1>0$ is advantageous to stretch the creases of the bank note 2, the contacting pressure of the bank note on the head 5 is increased due to the bending force created as aforementioned to cause undesirous generation of noise signal. On the other hand, if the device is operated under the condition of $T>D$, the positioning roller 15 is elastically deformed resulting in uneven change in compressive force applied on the magnetic detecting head 5, whereby undesirous noise signals are generated. To avoid generation of these undesired noise signals, the device according to this invention is operated under the conditions of $V_2-V_1=0$ and $T<D$.

However, even when using the device of this invention operated under the conditions as aforementioned, there is a possibility that the magnetic detecting head 5 might be impinged by the leading end of the bank note 2 passing through the gap D so that more or less impulsive force is applied on the head 5, whereby the head 5 picks up a noise signal. The bank note currently used in our country have maginal portions on which no printing inks are applied. The width of these non-printed marginal portions is about 3 to 5mm, so that there is some time lag between the impulse wave generated upon engagement of the leading end 2 of the bank note 2 with the magnetic detecting head 5 and the detection wave generated by the detected magnetic pattern.

In case where the travelling speed is 2 m/sec and the width of the non-printed margin is 5 mm, the time lag is calculated by:

$$5 \times 0.001 \div 2 = 0.0025 \text{ sec.}$$

Therefore, in practical use, if the damping factor (time constant) of the magnetic head 5 necessary for damping the impulsive wave is sufficiently short, for example shorter than 0.001 sec., no erroneous detection is resulted.

Because a commercially available magnetic head is used as the magnetic detecting head 5 in this embodiment, the travelling or conveyed speed of the bank note 2 has an upper limit. According to the experiments by the inventor, the bank note 2 can be discriminated with satisfactory accuracy when the conveying velocity $V_1$ is lower than 3 m/sec.

Figure 3:
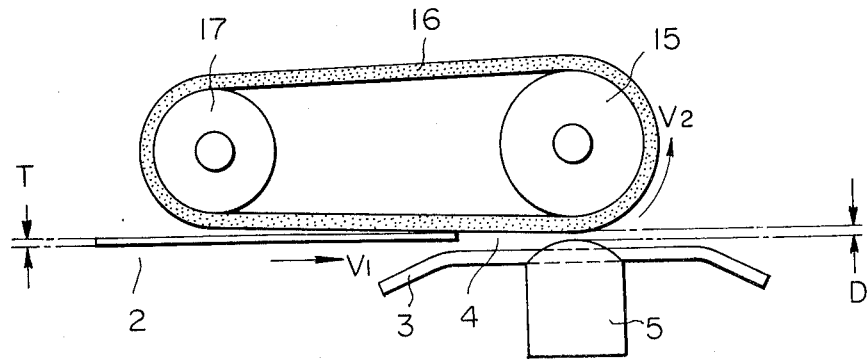
FIG. 3 is a diagrammatical view showing important parts of another embodiment of this invention.

A second embodiment of the invention is shown in FIG. 3. In this second embodiment, a conveyer belt 16 is wound around the positioning roller 15 and a driving roller 17. The magnetic head 5 is spaced from the lower face of the lower run of the conveyer belt 16 by the gap D which is greater than the thickness T of the bank notes. The driving roller 17 may be attached on the same shaft on which the conveyer roller 11 is attached or may be attached on a separate shaft. With this construction, the conveying velocity $V_1$ of the conveyer belt 16 and the travelling speed $V_2$ of the bank notes at the location just above the magnetic head 5 is equalized. In the second embodiment since the bank note 2 runs along the conveyer belt 16 at the same speed as that of the conveyer belt 16, while the bank note 2 gradually approaches to the conveyer belt 16, the bank note 2 first engages with the conveyer belt 16 in a very calm condition and then runs along the conveyer belt 16 together therewith. For this, there is no occurrence of noises.

It is believed that the features and advantages of this invention will be fully understood by those skilled in the art in the light of the disclosure given herein. However, this invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A magnetic detection device to be used in a bank note discriminating apparatus, comprising a conveyer for passing bank notes one by one along a bank note passage at a predetermined speed, a magnetic detecting head facing to said passage along which bank notes are conveyed by said conveyer, and a positioning roller opposing to said magnetic detecting head and spaced from said magnetic detecting head by a gap greater than the thickness of the passing bank notes, the circumferential speed of said positioning roller being substantially equal to the conveying speed of said conveyer.

2. A magnetic detection device as claimed in claim 1, wherein said conveyer includes two sets of paired conveyer rollers, and said magnetic head and said positioning roller are arranged in the way of said bank note passage defined by said two sets of paired conveyer rollers.

3. A magnetic detection device as claimed in claim 1, wherein said conveyer includes a conveyer belt which is wound around said positioning roller.

4. A magnetic detection device as claimed in claim 1, wherein the damping factor or time constant of said magnetic detecting head is shorter than 0.001 sec.

5. A magnetic detection device as claimed in claim 1, wherein said conveying speed of said conveyer is lower than 3 m/sec.

* * * * *